W. F. KOLB.
VALVE.
APPLICATION FILED APR. 4, 1914.

1,133,041.

Patented Mar. 23, 1915.

Witnesses
Edw. S. Hall.
W. E. Valk Jr.

Inventor
William F. Kolb.
By
Richard Bowen
his Attorney

UNITED STATES PATENT OFFICE.

WILLIAM F. KOLB, OF McDONALD, PENNSYLVANIA.

VALVE.

1,133,041.　　　　Specification of Letters Patent.　　Patented Mar. 23, 1915.

Application filed April 4, 1914. Serial No. 829,685.

*To all whom it may concern:*

Be it known that I, WILLIAM F. KOLB, a citizen of the United States, residing at McDonald, in the county of Washington and State of Pennsylvania, have invented certain new and useful Improvements in Valves, of which the following is a specification.

My invention relates to valves, and as its primary object contemplates an improved structure wherein communication between the inlet and outlet openings of the valve casing may be controlled through manipulation of a suitable stem.

A further object of the invention resides in the provision of a pair of spring pressed valve members so arranged relatively to the inlet and outlet openings of the casing as to be moved simultaneously and in the path of a circle, by a turning of the stem, either into or out of a position whereby to close communication between said openings.

The invention as a still further object aims to generally improve the structure of the casing, to effect, in practical application, a means whereby the several casing sections may be securely interlocked.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which—

Figure 1:
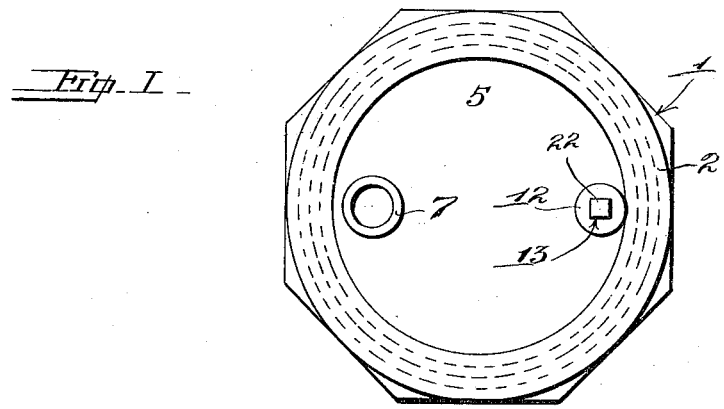
Figure 2:
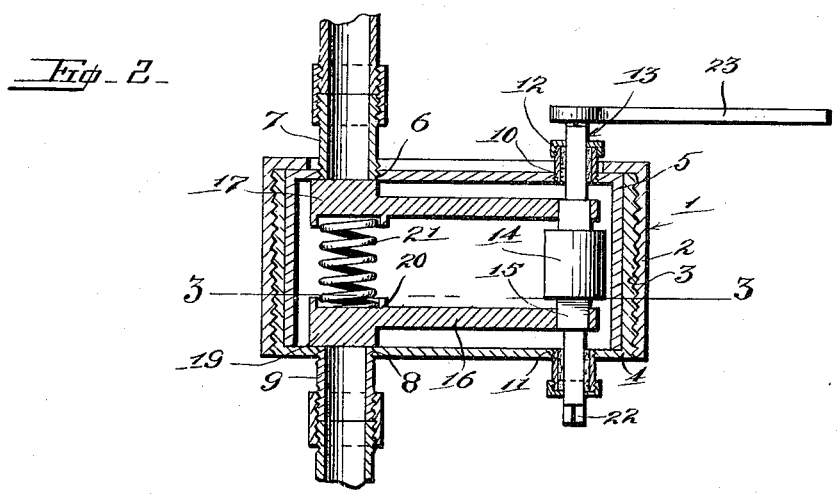
Figure 3:
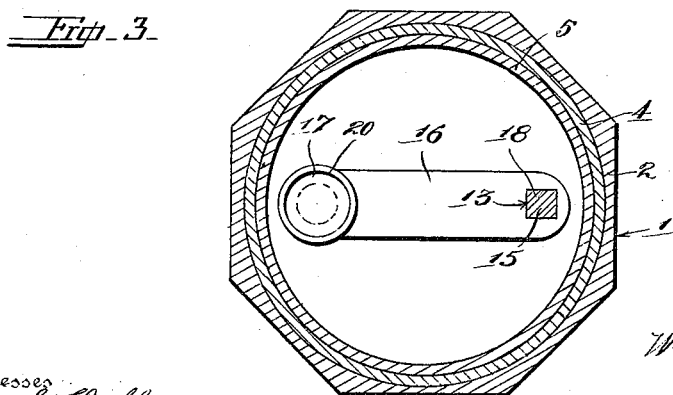

Figure 1 is an end view of the casing; Fig. 2 is a cross sectional view; and Fig. 3 is a section on the line 3—3 of Fig. 2.

Before proceeding with the description of the drawings I desire to call particular attention to the fact that while I have evolved my invention with reference to its application in connection with boiler pipes or the like, the same may be readily utilized for valve purposes generally.

Referring now to the drawings by numerals, 1 designates as an entirety, the casing, the same comprising an outer casing section 2, polygonal in form, and interiorly threaded as indicated at 3 to provide for the reception of a second casing section 4, the latter being exteriorly threaded to fit the said outer casing 1, and being provided with a smooth bore within which is fitted a third or inner casing section 5, said inner casing section being held in place by its engagement with the partially closed end of the outer section 2. The inner section 5 is provided with a threaded opening 6 whereby to receive a section of the inlet pipe 7, while the second or intermediate section 4 is provided with an opening 8 to provide for the reception of a section of the outlet pipe 9, the said two pipes 7 and 9 being axially alined and respectively in communication, as illustrated to advantage in Fig. 2 of the drawings, with the respective ends of the casing. Alined threaded openings 10 and 11 are formed in the said casing sections 5 and 4, which openings receive packing glands 12 through which an operating stem 13 extends. Said stem 13 extends parallel with the axis of the inlet and outlet pipes of the casing and at a point diametrically opposite thereto with respect to the casing 1. Said stem 13 equidistant its ends is annularly enlarged and indicated at 14. Said stem, at each end of the enlargement 14 is square or polygonal in cross section as indicated at 15, over which portion the stems 16 of valve members 17 are arranged, said stems each having an opening 18 formed therein whereby, upon a turning of the stem 13, the members 17 will be moved in the path of a circle. The free terminals of the members 17 are enlarged as at 19 and normally disposed to close the bore of the respective pipes 7 and 9, thus closing communication therebetween. An annular flange 20 is formed upon each member 17 and, within the recesses formed thereby, the terminals of an expansion helical spring 21 are seated, the tension of the said spring causing the members 17 to be at all times held in yielding engagement with the inner wall of the casing.

The stem 13, at each end, is polygonal in cross section as indicated at 22 to provide for the application of a wrench designated 23 in Fig. 2. The turning of the wrench will cause the stem to be bodily turned and the members 17 to be moved in the path of a circle until out of engagement with the pipes 7 and 9, in which position communication between the said pipes is effected. A reverse turning of the stem 13 will simultaneously move the members 17 into the position indicated in Fig. 2 thereby closing communication between the inlet and outlet openings of the casing, as desired.

From the foregoing, taken in connection with the accompanying drawings it is apparent that the entire casing 1 may be taken apart by first removing the outer casing section 1 and next, the inner casing section 5; that the valve members 17 are moved simultaneously in the path of a circle to open communication between the respective pipes 7 and 9; and that the tension of the spring 21 is sufficient to cause the said members 17 to at all times engage the inner wall of the casing in a manner necessary to proper operation of the valve.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. A valve structure including a valve casing comprising a first casing section having an opening formed therein, a second casing section arranged over said first casing section, said second casing section having an opening formed therein in alinement with said first opening, a third casing section arranged over the said two first mentioned casing sections, the said casing section serving as a locking means to maintain the said first two casing sections immovable and in place, and means movable within the interior of the casing to open and close communication between the respective openings.

2. A valve structure including a valve casing comprising relatively movable casing sections having alined openings formed therein, the outermost of the said casing sections being exteriorly threaded, a third casing section threaded upon the said outermost casing section to lock the said movable section in the desired adjusted position, and means movable within the valve casing to open and close communication between the respective openings.

3. A valve structure including a valve casing comprising relatively movable casing sections, the said sections having alined openings formed therein, detachable means engageable with the outermost of the said movable sections for locking the said movable sections in the desired adjusted position, a valve stem, valve members movable in unison through operation of said stem into and out of a position whereby to close communication between the respective openings, and spring means interposed between the said valve members to maintain the said members in engagement with the inner wall of the casing.

4. In a valve, a casing having an inlet opening and an outlet opening formed therein, the respective openings being alined and on opposite sides of the casing, a valve stem polygonal in cross section at points equi-distant from its ends, an enlargement formed on the stem between the polygonal portions aforesaid, parallel arms affixed, one arm on each side of the enlargement, the respective arms being engageable with the polygonal portion of the stem and movable therewith, a valve head formed on each arm, the respective valve heads being engageable with the opposite side of the casing and adapted to traverse the respective openings aforesaid, a spring interposed between the respective valve heads for holding the heads in engagement with the casing sides, means holding the spring against lateral displacement, and means to move the stem.

5. A valve structure including a casing comprising a plurality of casing sections arranged to fit one within the other, said casing having an inlet and an outlet opening formed therein, the said openings being alined, a turnable operating stem, said stem being polygonal in cross section at points intermediate its ends, valve members operable within the casing, said members being secured to the respective polygonal portions of said stem, said members being normally in engagement with the interior wall of the casing and to close communication between the said inlet and outlet openings, a spring interposed between the said two members normally maintaining the same apart, said two members being movable in the path of a circle through a turning of said stem to open communication between said openings, as and for the purpose set forth.

In testimony whereof I affix my signature in presence of two witnesses.

WILLIAM F. KOLB.

Witnesses:
 JOHN BEHLING,
 GUSTAV WINTER.

Copies of this patent may be obtained for five cents each, by addressing the "Commissioner of Patents, Washington, D. C."